(12) United States Patent
Storto et al.

(10) Patent No.: US 11,766,022 B2
(45) Date of Patent: Sep. 26, 2023

(54) CAGE FOR LABORATORY ANIMALS AND SHELVING ADAPTED TO HOUSE A PLURALITY OF CAGES FOR LABORATORY ANIMALS

(71) Applicant: TECNIPLAST S.P.A., Buguggiate (IT)

(72) Inventors: Marco Storto, Monza (IT); Lorena Cattaneo, Busto Arsizio (IT); Marco Garzola, Varese (IT); Fabio Iannello, Varese (IT); Vincenzo Carollo, Varese (IT); Niccolò Gumiero, Gallarate (IT)

(73) Assignee: TECNIPLAST S.P.A, Buguggiate (IT)

( * ) Notice: Subject to any disclaimer, the term of this patent is extended or adjusted under 35 U.S.C. 154(b) by 67 days.

(21) Appl. No.: 17/317,116

(22) Filed: May 11, 2021

(65) Prior Publication Data
US 2021/0352869 A1    Nov. 18, 2021

(30) Foreign Application Priority Data

May 13, 2020    (IT) .......................... 102020000010921

(51) Int. Cl.
*A01K 1/03*    (2006.01)
*A01K 1/035*    (2006.01)
(Continued)

(52) U.S. Cl.
CPC .............. *A01K 1/031* (2013.01); *A01K 1/035* (2013.01); *A47B 87/0207* (2013.01); *G01F 17/00* (2013.01)

(58) Field of Classification Search
CPC .... A01K 31/031; A01K 31/035; A01K 1/031; A01K 1/035; G01F 17/00; G01F 23/284; A47B 87/0207
(Continued)

(56) References Cited

U.S. PATENT DOCUMENTS 6,367,418 B1 *    4/2002    Ulman ................... A01K 1/031
                                                    119/57.92
7,497,187 B2 *    3/2009    Ingley, III .............. A01K 1/031
                                                    119/417
(Continued)

FOREIGN PATENT DOCUMENTS

EP    1719406 A1    11/2006
EP    2473322 A1    7/2012
(Continued)

OTHER PUBLICATIONS

Search Report & Written Opinion received for the Italian Application No. 202000010921 dated Jan. 20, 2021, 10 pages.

*Primary Examiner* — Timothy D Collins
*Assistant Examiner* — Maria E Graber
(74) *Attorney, Agent, or Firm* — AMSTER ROTHSTEIN & EBENSTEIN LLP

(57) ABSTRACT

A cage for housing laboratory animals, said cage includes a bowl and a cap or cover which may be positioned on said bowl in a removable manner, wherein the cap and the bowl, with the cap positioned on the bowl, define an internal space which is closed and not accessible from the outside, wherein in the internal space a feeder is positioned, adapted to contain food adapted to feed the laboratory animals, wherein the cage is equipped with first means adapted to detect the presence and/or quantity of food in the feeder.

18 Claims, 19 Drawing Sheets

(51) Int. Cl.
*G01F 17/00* (2006.01)
*A47B 87/02* (2006.01)

(58) Field of Classification Search
USPC .......................................................... 119/417
See application file for complete search history.

(56) References Cited

U.S. PATENT DOCUMENTS

| | | | | |
|---|---|---|---|---|
| 8,074,602 | B2* | 12/2011 | Laliberte | A01K 5/0275 |
| | | | | 119/61.2 |
| 9,516,858 | B2* | 12/2016 | Conger | A01K 1/031 |
| 2007/0256643 | A1* | 11/2007 | Coiro | A01K 1/031 |
| | | | | 119/457 |
| 2009/0002496 | A1* | 1/2009 | Esmaeili | A01K 1/031 |
| | | | | 348/207.1 |
| 2009/0293815 | A1* | 12/2009 | Coiro, Sr. | A01K 1/031 |
| | | | | 119/417 |

FOREIGN PATENT DOCUMENTS

| | | | |
|---|---|---|---|
| EP | 2499907 | A1 | 9/2012 |
| EP | 2760281 | A1 | 8/2014 |
| EP | 3643165 | A1 | 4/2020 |

* cited by examiner

CAGE FOR LABORATORY ANIMALS AND SHELVING ADAPTED TO HOUSE A PLURALITY OF CAGES FOR LABORATORY ANIMALS

CROSS-REFERENCE TO RELATED APPLICATION

This application claims priority to Italian patent application No. 102020000010921, filed May 13, 2020, the contents of which are incorporated by reference herein in its entirety.

FIELD OF THE INVENTION

The present invention belongs to the field of laboratory animal housing. In particular, the present invention relates to a cage for housing laboratory animals and to a shelving adapted to house a plurality of cages for laboratory animals. In detail, the present invention relates to a cage of the aforesaid type, improved according to an innovative solution so as to allow the monitoring of the presence or absence of a watering liquid container and/or of the quantity of said liquids in said container, as well as of the presence and absence and/or quantity of food in the feeder. The present invention relates to a shelving adapted to house a plurality of cages for laboratory animals, improved according to an innovative solution so as to allow the monitoring of the presence or absence of at least one cage of said plurality of cages.

BACKGROUND ART

To date, the use of cages, for example, but not exclusively, "ventilated", i.e., in which a flow of forced air is circulated from a main circuit, is quite common for housing laboratory animals such as, for example, small rodents or the like.

The cages of the known type, or at least the most commonly used ones, essentially comprise a bowl or tray intended to contain the litter, and a cap or lid (also referred to as top or cover later on), wherein, with the lid positioned above the bowl, the access to the internal space defined by the bowl-lid system is prevented, and wherein, in case the lid is fastened to the bowl (for example, by means of suitable closing means such as clips, handles or the like), and by virtue of a possible gasket positioned between the bowl and the lid, the desired seal is ensured, so that the bowl-lid system is adequately isolated from the external environment, in particular from the facility where the facility users operate, thereby avoiding contamination both from the facility towards the inside of the cage, as well as from the inside of the cage towards the facility or external environment.

Furthermore, in the internal space defined by the bowl-lid system, a third component is usually housed, simply called feeder, usually made of metal and shaped and positioned so as to contain the feed in an accessible position for the animals and, preferably, so that the feed does not come into contact with the litter. Finally, inside the cage, or even outside and resting on the cover, a bottle with watering water may be arranged.

It should also be considered that, in the vast majority of cases, housing cages are arranged or stowed on housing shelvings which, in turn, are stored or stowed in housing environments according to predefined and variable layouts, both depending on the housing modes or methods as well as depending on the shape of the environments themselves, often obtained in the basement of laboratories and/or research centers in general.

The arrangement of the cages in the shelvings hinders, or even prevents, given the density of the cages in the shelvings, the visual monitoring, by the operators, of the presence or absence of the watering bottle and of the quantity of water or watering liquids therein, as well as of the presence or absence of food in the feeder and of the quantity of food therein.

Said objective difficulties relating to the visual monitoring have therefore stimulated the development of solutions adapted to ensure a monitoring, which is continuous over time, or at least periodic and reliable, of the presence or absence of the watering bottle and of the quantity of water or watering liquids therein, as well as of the presence or absence of food in the feeder and of the quantity of food therein.

Among the solutions proposed and currently known and available, the following solutions may be mentioned.

According to a first solution according to the background art, to automatically detect the presence of food in the feeder and of the bottle, use is made of optical technologies (LEDs operating in the infrared) similar from a functional point of view to photocells.

According to a further known solution, to monitor not only the presence, but also the consumption of water and food, use is made of scales which measure the weight of the food and of the water, thus monitoring the consumption thereof over time.

Finally, other systems exist which monitor the presence and level of water and food by means of video cameras, as well as systems capable of detecting the presence of the cages inside a housing rack (shelving).

The above solutions according to the background art, however, are affected by issues and/or drawbacks which the applicant intends to overcome by means of the present invention.

For example, the solutions which make use of optical solutions, such as IR-LEDs, require the integration of electronics on the sides of the cage to obtain the photocell effect ("beam-breaker"). This type of solution, although simple, is markedly unreliable since it may be subject to false positives due to the accidental passage of the animal in the field of action of the light beam. In addition, any "enrichments" inside the cage may equally negatively affect the detection system due to the related optical obstructions.

The same issues mentioned above may be found, at least in part, also in solutions based on vision systems (video camera). The latter are in fact complex from a computational point of view, require mechanical precautions to be installed in the correct positions and a possible mechanical protection from potential accidental impacts, due to the handling of the cages by the operators.

Finally, detection systems using radiofrequency identification techniques (see RFID) require the installation of RFID readers and the installation of RFID tags on the objects to be traced, which may be complicated from the point of view of the mechanics, of the electrical insulation and of the resistance to washing and sanitizing and handling procedures.

Therefore, it is the main object of the present invention to overcome or at least reduce or minimize the drawbacks and the issues encountered in the detection systems according to the background art.

In particular, it is a first object of the present invention to provide a solution which is not affected by obstructions inside the cage (enrichments, movements of animals, displacement or accumulation of litter or other material).

It is also a further object of the present invention to provide a solution which allows the electronics to be concentrated on a single planar circuit outside the cage. Furthermore, the system according to the present invention shall not be affected by the issue linked to the dirtiness and degradation (opacity) of the materials (typical of IR solutions) due both to aging and to autoclaving, or to optical obstruction (issue encountered both in IR systems as well as in video camera systems).

Finally, the system according to the present invention shall ensure a perfect isolation of the circuitry and of the sensors in the autoclave (the treatment in the autoclave being provided for washing and/or sterilizing the cages).

SUMMARY

In consideration both of the drawbacks encountered in the background art as well as of the prefixed objects, according to a first embodiment, it is the object of the present invention a cage for housing laboratory animals, said cage comprising a bowl and a cap or cover which may be positioned on said bowl in a removable manner, wherein said cap and said bowl, with said cap positioned on said bowl, define an internal space which is closed and not accessible from the outside, wherein in said internal space a feeder is positioned, adapted to contain food adapted to feed said laboratory animals, wherein said cage is equipped with first means adapted to detect the presence and/or quantity of food in said feeder, wherein said first means adapted to detect the presence and/or quantity of food in said feeder comprise first means adapted to generate a magnetic field and first means adapted to detect and measure said magnetic field along at least two directions orthogonal to one another (x,y) or (x,z) or (y,z), and wherein said first means adapted to generate said magnetic field are movable and positioned so that each variation equal to, or greater than a predefined variation of the quantity of food in said feeder translates into a variation of at least the intensity and/or the direction of said magnetic field along at least one of said two directions orthogonal to one another (x,y) or (x,z) or (y,z).

According to an embodiment, said first means adapted to generate a magnetic field are applied to a first movable support adapted to be arranged resting on the food contained in said feeder.

According to an embodiment, said first movable support is rotatably fastened to said cover above said feeder so that the free end of said first movable support may be arranged resting on the food inside said feeder, wherein the decrease in the food inside said feeder translates into a rotation of said first movable support in a first direction of rotation, while the increase in the food inside said feeder translates into the rotation of said first movable support in a second direction of rotation opposite to said first direction of rotation.

According to an embodiment, said cage is also equipped with a liquid container adapted to water said laboratory animals, wherein said cage is also equipped with second means adapted to detect the presence and/or quantity of said liquids inside said container, wherein said second means adapted to detect the presence and/or quantity of liquids in said container comprise second means adapted to generate a magnetic field and wherein said second means adapted to generate said magnetic field are movable and positioned so that each variation equal to, or greater than a predefined variation of the quantity of said liquids in said container translates into a variation of at least the intensity and/or the direction of said magnetic field along at least one of said two directions orthogonal to one another (x,y) or (x,z) or (y,z).

According to an embodiment, said second means adapted to generate a magnetic field are applied to a floating movable support adapted to be arranged inside said container floating on the liquids contained therein.

According to an embodiment, said cage is also equipped with a liquid container adapted to water said laboratory animals, wherein said cage is also equipped with third means adapted to detect the presence and absence of said container, wherein said third means adapted to detect the presence of said container comprise third means adapted to generate a magnetic field and wherein said third means adapted to generate said magnetic field are positioned with respect to said container so that the absence of said container translates into a variation of at least the intensity and/or the direction of said magnetic field along at least one of said two directions orthogonal to one another (x,y) or (x,z) or (y,z) with respect to the intensity and/or the direction of said magnetic field along at least one of said two directions orthogonal to one another (x,y) or (x,z) or (y,z) in presence of said container.

According to an embodiment, said third means adapted to generate said magnetic field are fastened to said cage in positions which are fixed with respect to said container.

According to an embodiment, said third means adapted to generate a magnetic field are applied to a second movable support adapted to be arranged resting on a predefined portion of said container, and wherein said second movable support is rotatably fastened to said cage so that the free end of said second movable support, in the presence of said container, is arranged resting on said predefined portion of said container, so that the removal of said container translates into a rotation of said support in a first direction of rotation, and therefore in a variation of at least the intensity and/or the direction of said magnetic field along at least one of said two directions orthogonal to one another (x,y) or (x,z) or (y,z).

According to an embodiment, said cap or cover defines at least one recess adapted to house at least part of said container for watering liquids outside said cage.

According to an embodiment, said first or second or third means adapted to generate a magnetic field comprise a permanent magnet or an electromagnet.

It is a further object of the present invention a shelving for housing laboratory animals, wherein said shelving is shaped so as to be capable of housing a plurality of housing cages, wherein said shelving comprises fourth means adapted to detect the presence and absence of at least one of said cages, wherein said fourth means adapted to detect the presence and absence of said at least one cage comprise fourth means adapted to generate a magnetic field and second means adapted to detect and measure said magnetic field along at least two directions orthogonal to one another (x, y or x, z or y, z), and wherein said fourth means adapted to generate said magnetic field are positioned with respect to said at least one cage so that the absence of said at least one cage translates into a variation of at least the intensity and/or the direction of said magnetic field along at least one of said two directions orthogonal to one another (x,y) or (x,z) or (y,z) with respect to the intensity and/or, respectively, the direction of said magnetic field along at least one of said two directions orthogonal to one another (x,y) or (x,z) or (y,z) in the presence of said at least one cage.

According to an embodiment, said fourth means adapted to generate said magnetic field are fastened to said shelving in positions which are fixed with respect to said at least one cage.

According to an embodiment, said fourth means adapted to generate a magnetic field are applied to a third movable support adapted to be arranged resting on a predefined portion of said at least one cage, wherein said third movable support is rotatably fastened to said shelving so that the free end of said third support, in the presence of said at least one cage, is arranged resting on said predefined portion of said at least one cage, wherein the removal of said at least one cage from said shelving translates into a rotation of said support in a first direction of rotation and therefore in a variation of at least the intensity and/or the direction of said magnetic field along at least one of said two directions orthogonal to one another (x,y) or (x,z) or (y,z) with respect to the intensity and/or, respectively, the direction of said magnetic field along at least one of said two directions orthogonal to one another (x,y) or (x,z) or (y,z) in the presence of said at least one cage.

According to an embodiment, said at least one cage is a cage according to one of the embodiments of the present invention.

According to an embodiment, each cage of said plurality of cages is a cage according to one of the embodiments of the present invention.

Further possible embodiments of the present invention are defined by the claims.

BRIEF DESCRIPTION OF THE DRAWINGS

Hereinafter, the present invention will be further explained by means of the detailed description of the embodiments thereof depicted on the drawings, in which corresponding or equivalent features and/or component parts of the present invention are identified by the same reference numbers. It must be noted that the present invention is not limited to the embodiments described below and depicted in the accompanying drawings; on the contrary, all the variants and/or changes to the embodiments described below and depicted in the accompanying drawings which will appear clear and obvious to a person skilled in the art fall within the scope of the present invention. In the drawings.

Figure 15:
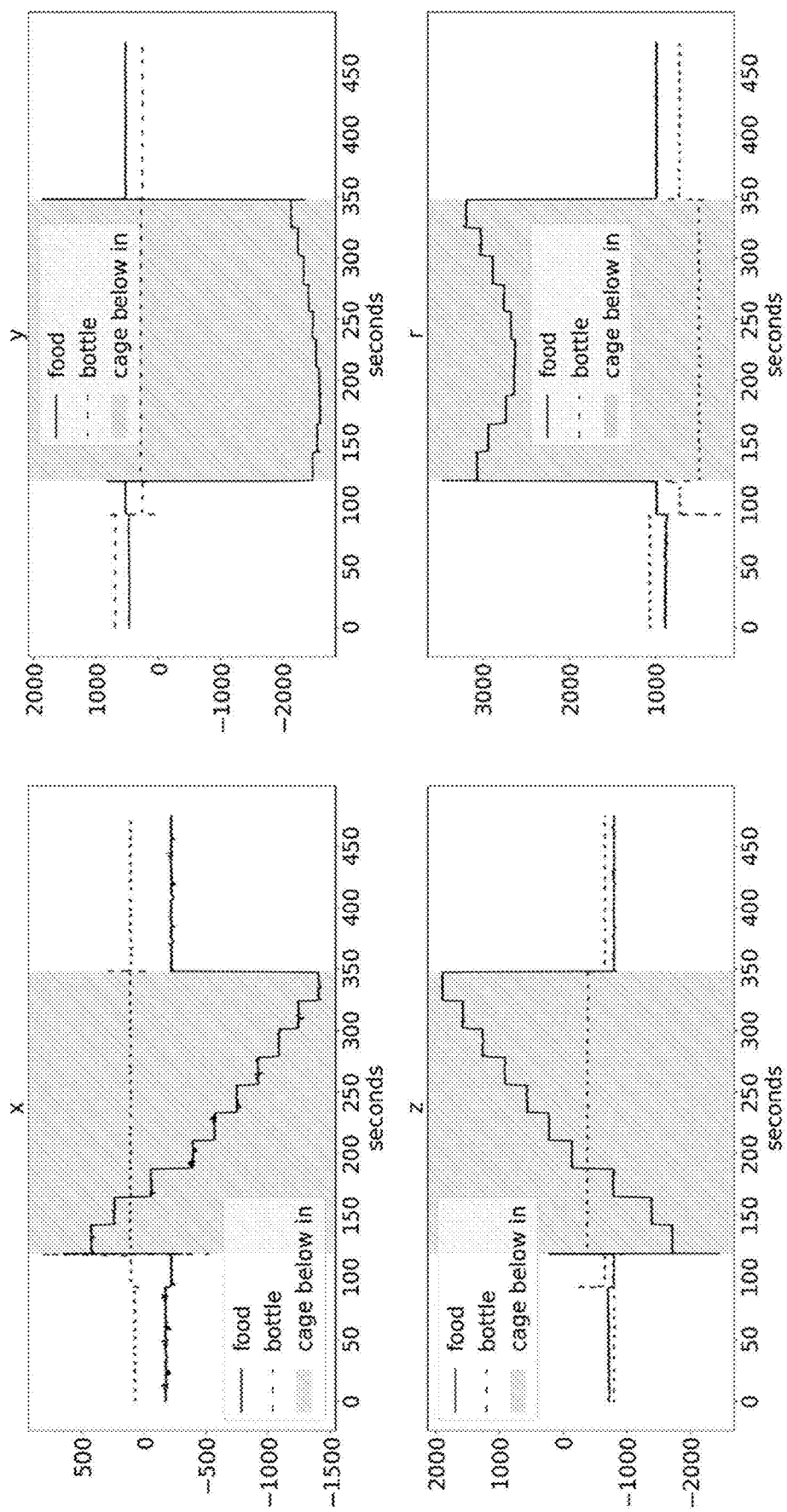
Figure 16:
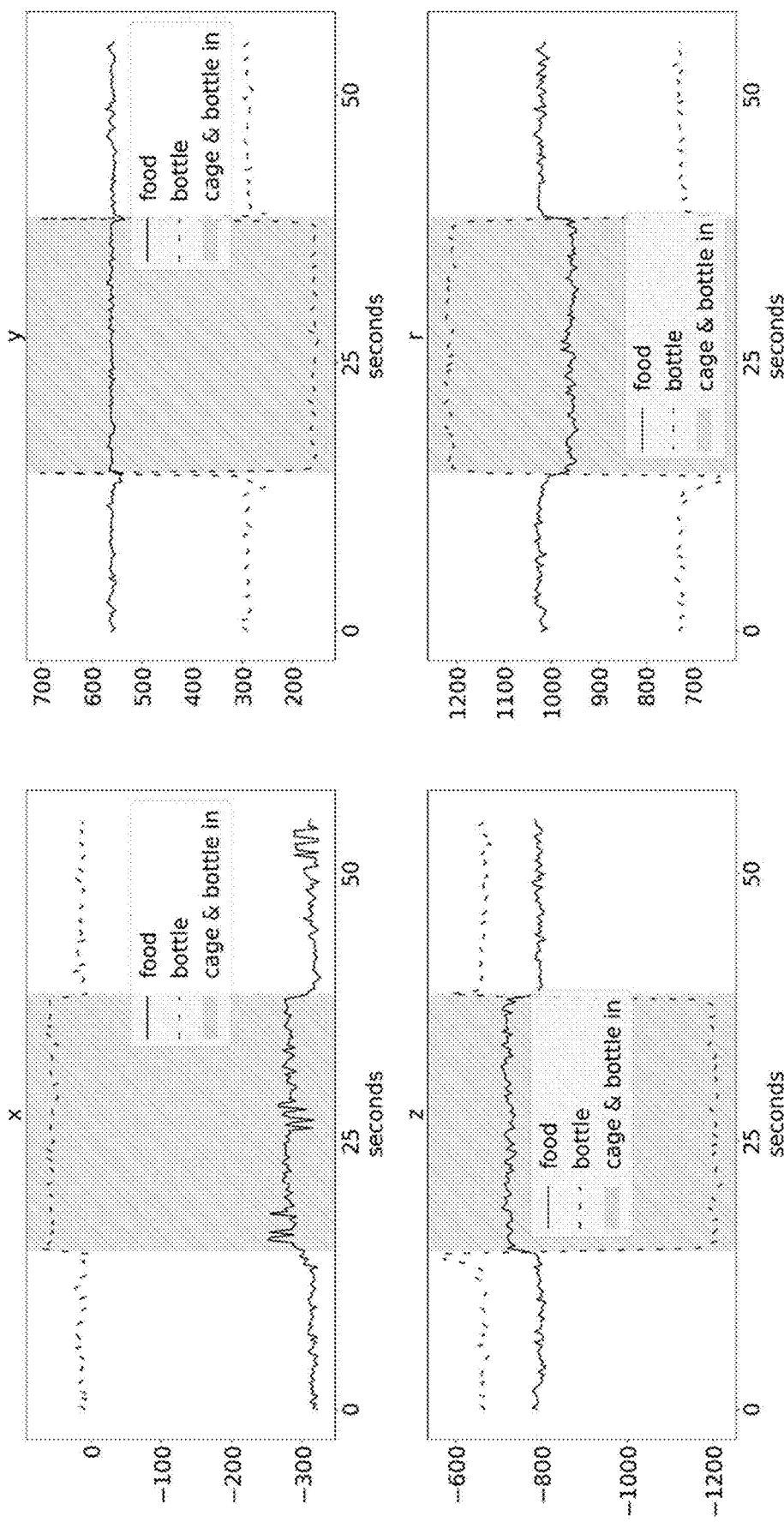
Figure 17:
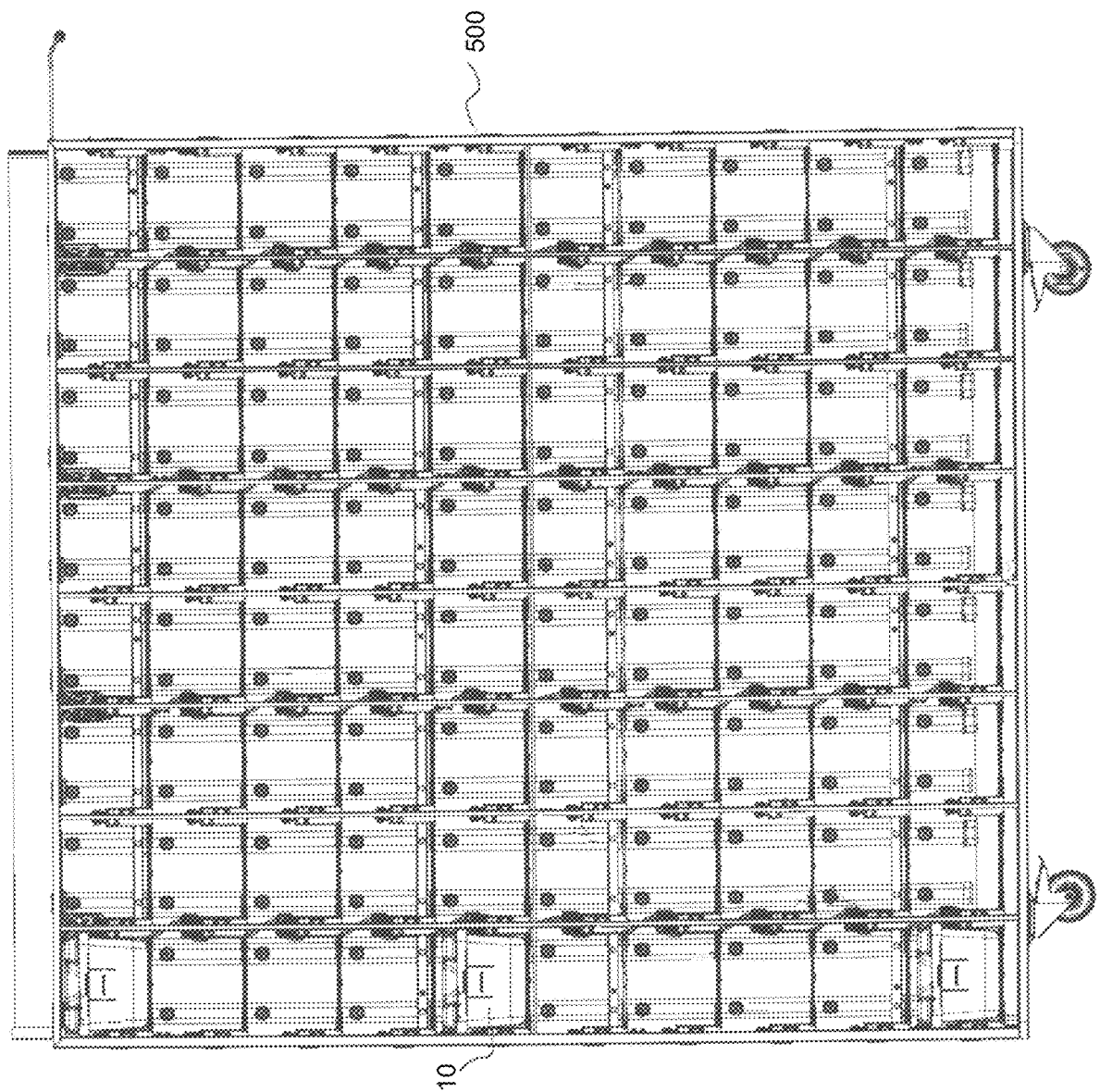
Figure 18:
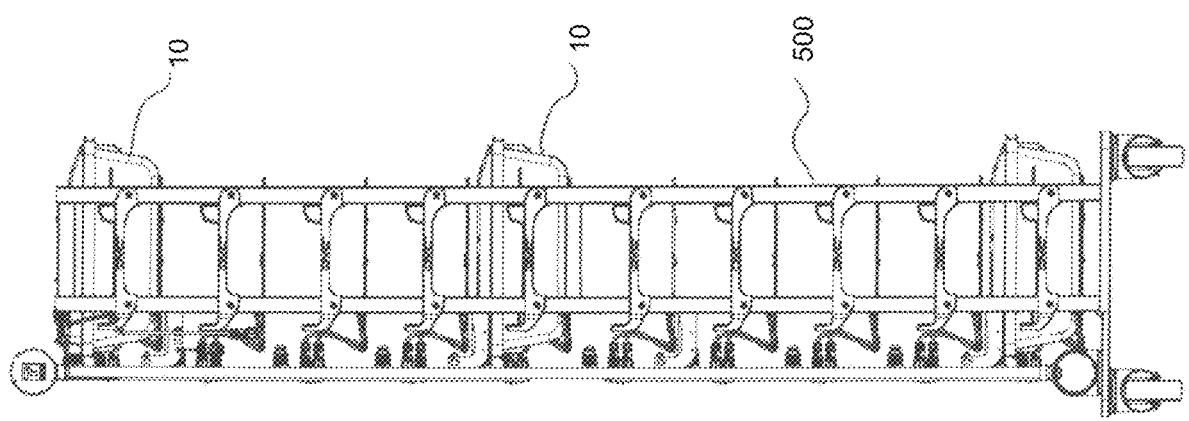
Figure 19:
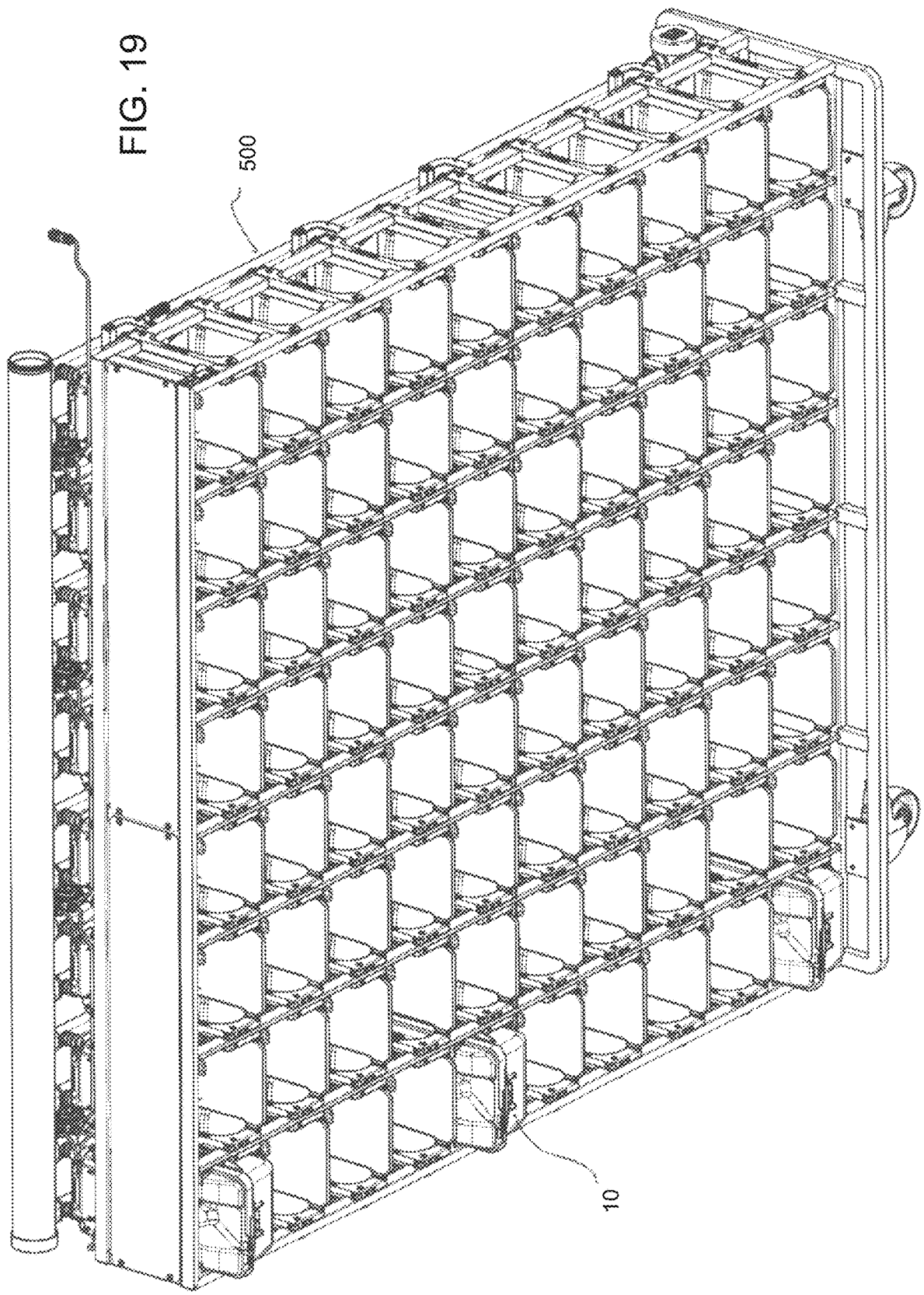

The charts in FIG. 15 show the variation of the magnetic field detected as a function of the variation of the quantity of food in the feeder and of the quantity of liquid in the watering bottle, respectively;

The charts in FIG. 16 show the significant variation on the three components of the magnetic field during the insertion and the removal of the watering bottle;

FIGS. 17 to 19 respectively show a first side view, a second side view and a perspective view of a shelving according to an embodiment of the present invention for stowing cages for laboratory animals.

DETAILED DESCRIPTION OF THE PRESENT INVENTION

The present invention finds particularly advantageous application in the field of laboratory animal housing, this being the reason why the present invention will be described hereinafter with particular reference to the applications thereof in the field of animal housing.

However, it is worth specifying that the possible applications of the present invention are not limited to those described below. On the contrary, the present invention is conveniently applied in all cases in which it is necessary to monitor the presence and absence of a container and/or the presence and/or quantity of liquid and/or solid materials inside said container, as well as in all cases in which it is necessary to detect the presence/absence of a component in a shelving adapted to stow a plurality of said components.

Figure 1:
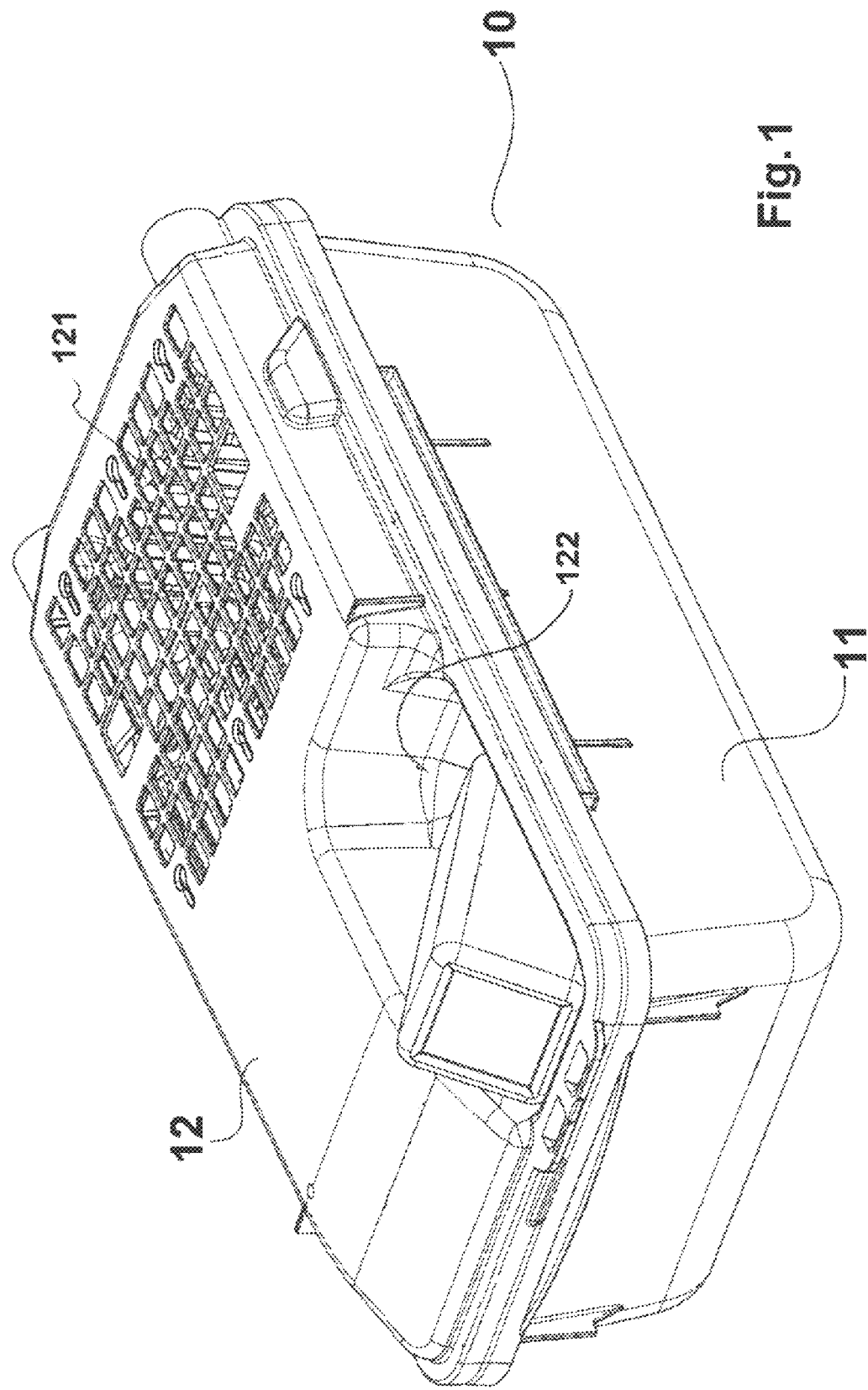
FIG. 1 shows a perspective view of a cage according to an embodiment of the present invention.
Figure 2:
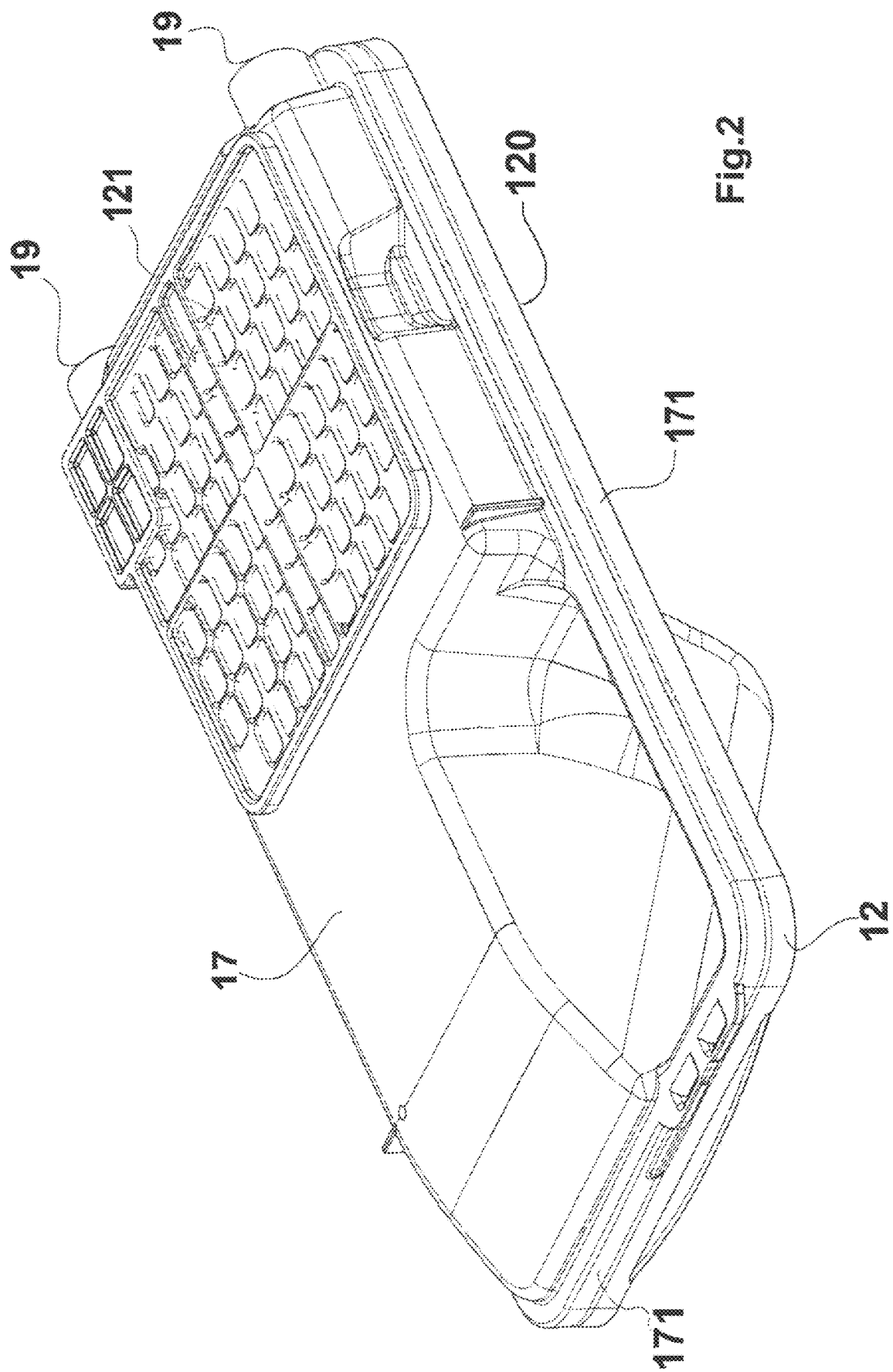
FIG. 2 shows a perspective view of a cover (cap) of a cage according to an embodiment of the present invention.
Figure 3:
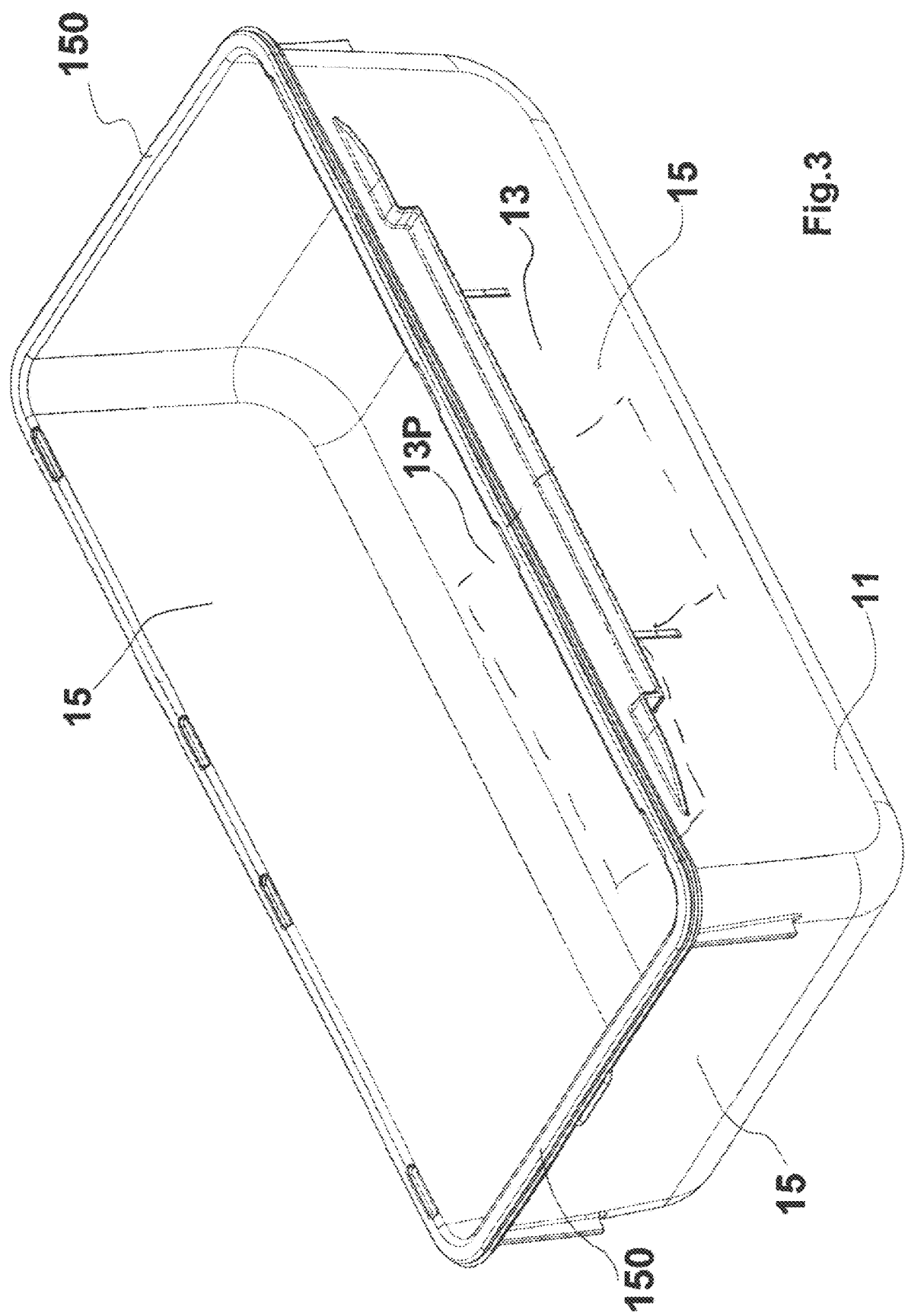
FIG. 3 shows a perspective view of a bowl of a cage according to an embodiment of the present invention.

In FIGS. 1 to 3, the cage according to the embodiment of the present invention depicted therein is identified, as a whole, by the reference 10; as depicted, the cage 10 comprises a bowl 11 essentially intended to contain the litter for the animals to be housed (possibly together with other accessories), wherein the bowl 11 defines part of the space available to the animals. Again as depicted, the cage 10 comprises a closing cap or cover 12 adapted to be positioned on the bowl 11 (and possibly fastened thereto by means of fastening means, not shown) in the aforesaid closed position of FIG. 1 (in which it prevents the animals to escape and also the access to the inside of the bowl 11), and to be removed from the bowl 11, for example, when it is necessary to access the inside of the bowl 11 by an operator and/or when it is necessary to perform operations such as, for example, changing the litter or similar operations. In the following, in accordance with the terminology commonly accepted and used by the operators in the sector, the cap 12 will possibly also be defined as "lid" or simply "top".

In detail, as depicted, the bowl 11 has a box-like shape (and rectangular in the still non-limiting example shown in the Figures) and comprises a substantially flat bottom wall 13 and four side walls 15 which are opposite to each other in pairs, connected to each other and connected at the bottom wall 13. For its part, as depicted in FIG. 2, the cap 12 comprises an actual covering portion or main wall 17, from which a side skirt 171 extends in a substantially transverse direction, giving the cap 12 the shape of a tray, and Said side skirt is formed by four side walls 171 mutually connected in pairs and each connected to the main wall 17. According to the embodiment shown in FIG. 2, the cap 12 comprises a grid 121, a recess 122 for accommodating and positioning a container (bottle, FIG. 6) 80 for watering liquids, as well as air intakes 19 respectively for the introduction into and the discharge from the cage 10 of ventilated and/or forced air.

The air intakes 19, as well as the grid 121, are however not essential for the objects of the present invention and therefore a detailed description thereof is omitted, for the sake of synthesis.

Again, as depicted in the Figures, the side walls 15 of the bowl 11 are mutually connected to define an edge 150, which is called supporting edge for reasons explained below.

Furthermore, the side walls 171 of the cap 12 are also mutually connected to define an edge 120, in this case called engagement edge.

In fact, with the cap 12 positioned on the bowl 11, as shown in FIG. 1, and therefore defining the internal space 14 delimited by the bowl-cap system or assembly, preventing the access to said space 14, the edges 150 of the bowl 11 and 120 of the cap 12 are opposed to each other, wherein the edge 150 supports the cap 12 and is therefore engaged by the edge 120.

Figure 4:
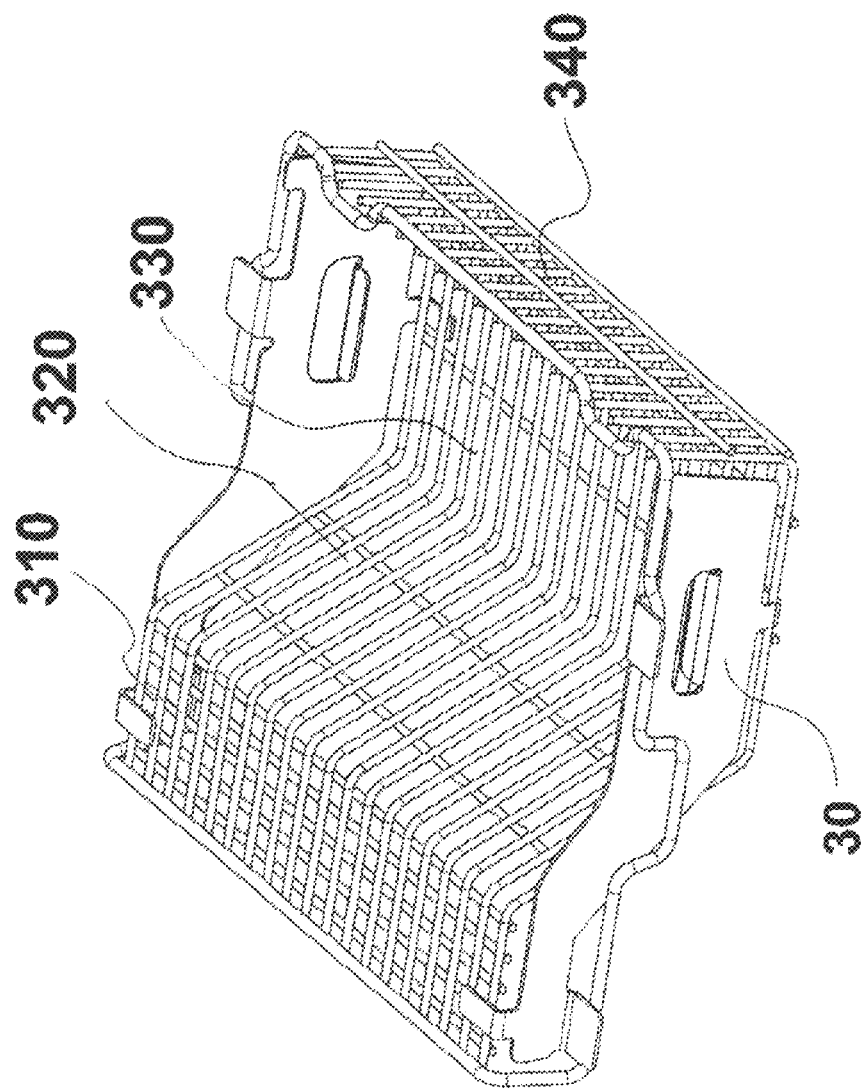
FIG. 4 shows a perspective view of a feeder for a cage according to an embodiment of the present invention.
Figure 5:
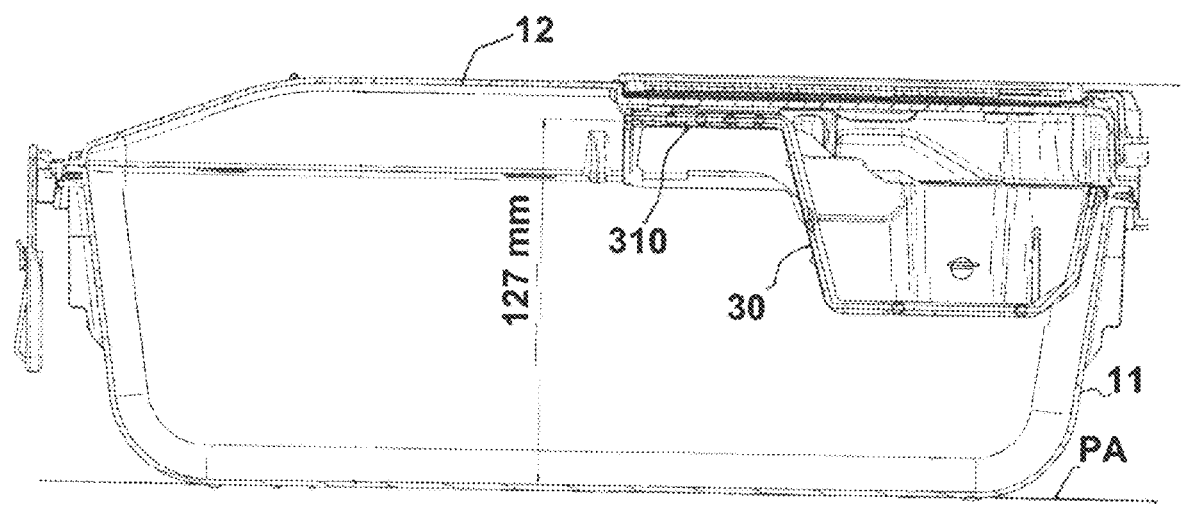
FIG. 5 shows a longitudinal vertical sectional view of a cage according to an embodiment of the present invention.

With regard to the feeder 30 of FIGS. 4 and 5, the same, made, for example, of metal but also of plastic material, is intended to be positioned in the cage 10, for example, as shown in FIG. 5, and is shaped so as to contain and provide the animals with a feed, in particular, so that the feed does not come into contact with the litter.

According to the non-limiting embodiment shown in the Figures, the feeder 30 comprises a substantially flat upper portion 310, from which an inclined connecting portion 320 extends, which precisely connects the flat upper portion 310 with a lower flat portion 330, wherein the connecting portion 320, the lower flat portion 330 and a side portion 340 of the feeder 30 define a housing basin for housing the feed.

Furthermore, as depicted, the longitudinal extension of the feeder (from the right to the left and vice versa, in FIGS. 4 and 5) is shorter than the longitudinal extension of the cap 12, wherein therefore at least one portion of the main wall 17 is not "obscured" by the feeder 30 (the feeder 30 and said at least one portion of the main wall 17 are not vertically overlapped).

And again, at least the flat upper part 310 and part of the connecting portion 320 of the feeder 30 are housed inside the cap 12, wherein, furthermore, the basin-shaped portion is arranged adjacent (opposed, even if vertically out of phase) to the air intakes 19 obtained in the cap 12.

The aforementioned shape and arrangement of the feeder 30 offer the multiple result of: still allowing access to the inside of the bowl 11 (without the need to remove the feeder 30); making the air intakes 19 unreachable for the animals (the air intakes 19 being obscured by the basin-shaped portion of the feeder 30); not negatively affecting (not reducing) the free span or minimum height available to the animals, or, in other words, allowing that, at least at a portion 13P (indicated, by way of example, by hatching in FIG. 3), the surface of which is at least equal to 50% of the total floor area defined by the bottom 13, the free span or minimum height available to the animals complies with housing regulations.

As anticipated, the cage according to the present invention includes further peculiarities aimed at monitoring the presence of the bottle 80 and/or the quantity of liquid inside the bottle 80, said peculiarities being described below with reference to FIGS. 6 and 7.

As depicted, with the bottle 80 accommodated in the recess 122 of the cap 12, the dispensing nozzle of the bottle 80 is accommodated inside the cage 10, in particular in the space available to the animals, in a position accessible to the animals themselves.

An "add-on", in particular a rigid fin 81, is arranged inside the cap 12, in particular constrained to the cap 12 rotatably about a rotation axis A-A, in a position such that the free end of the fin 81 opposite to the rotation axis A-A is arranged resting on the dispensing spout 83 of the bottle 80. Furthermore, a magnet 84 (for example, a permanent magnet, see the following description), or in any case a component adapted to generate a magnetic field, is fastened on the fin 81. The cage 10 is also equipped with magnetometers, fastened to or positioned near the cap 12 and/or the bowl 11, said magnetometers (not depicted) being adapted to detect, at a distance (inside and/or outside the cage), the intensity and the direction of the magnetic field on 3 orthogonal axes x, y and z. The removal of the bottle 80 from the recess 122 obviously translates into a rotation of the fin 81 and of the relative magnet 84 about the rotation axis A-A, in particular in a clockwise direction with respect to FIG. 7, and therefore into a variation of the intensity and/or direction of the magnetic field measured by the magnetometers along at least two of the 3 orthogonal axes x, y and z, the variation of the magnetic field as detected (FIG. 15) being ultimately indicative of the absence of the bottle 80.

FIG. 15 shows the magnetic field values detected by the magnetometers when the cage 10 is positioned so that the magnets are in an underlying position with respect to the support of the magnetometers.

FIG. 16 shows the magnetic field values detected by the magnetometers when the cage 10 (with container 80) is positioned in the same position on which the magnetometer is mounted.

Figure 6:
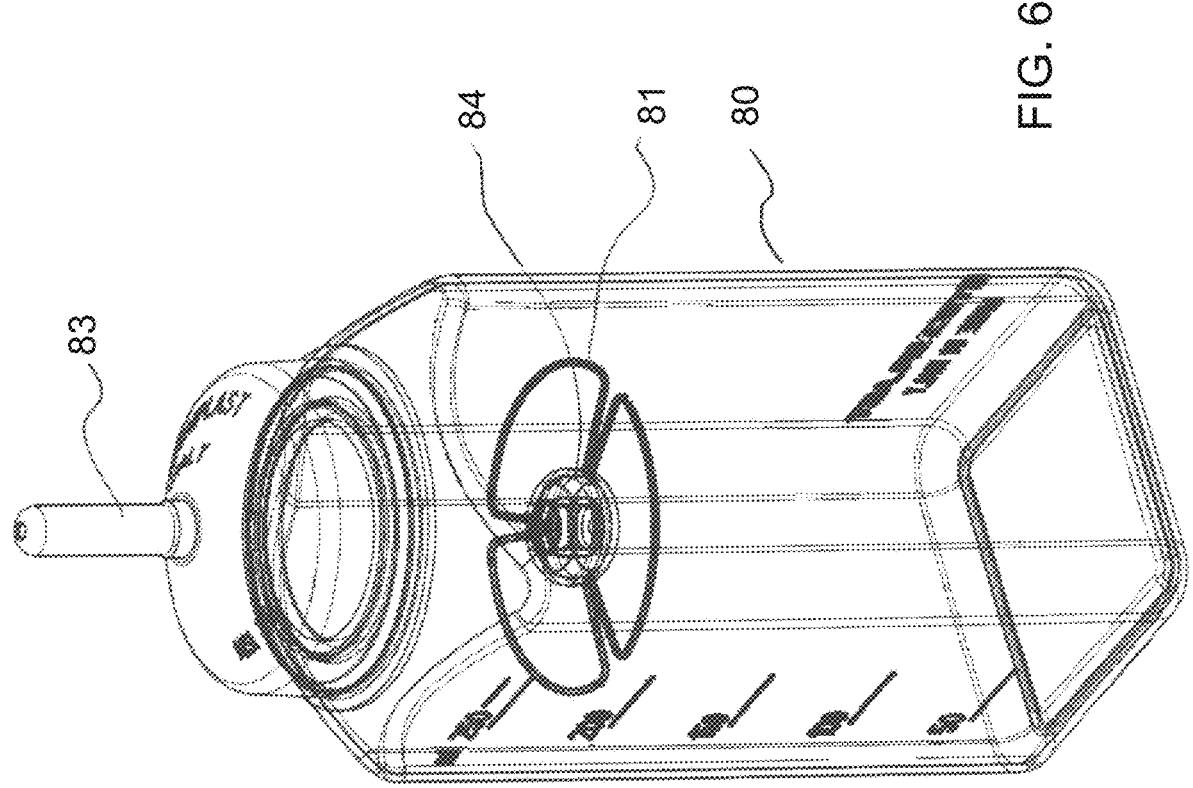
FIG. 6 shows a perspective view of a bottle of a cage according to an embodiment of the present invention.

A similar solution, not aimed, however, at detecting the presence of the bottle 80, but rather at detecting the quantity of liquids in the bottle 80, is depicted in FIG. 6. According to this solution, which may be implemented both as an alternative as well as in addition to that of FIG. 7, the add-on or fin 81 is accommodated in the bottle 80 so as to float on the liquids contained therein.

It is therefore clear that, in this case, the removal and the decrease of liquid in the bottle 80 obviously translates into a (rotational and/or translational) displacement of the fin 81 and of the relative magnet 84, and therefore into a variation of the intensity and/or direction of the magnetic field measured by the magnetometers along the 3 orthogonal axes x, y and z, the variation of the magnetic field as detected (FIG. 16) being ultimately indicative of the variation of the quantity of liquid in the bottle 80.

The present invention offers a wide choice regarding the implementation of magnets. It is in fact possible not only to fasten the magnet 84 to the fin 81, but also to have the fin 81 made of magnetic metal, of plastic with an overmolded magnet 84, of a magnetic polymer.

Figure 7:
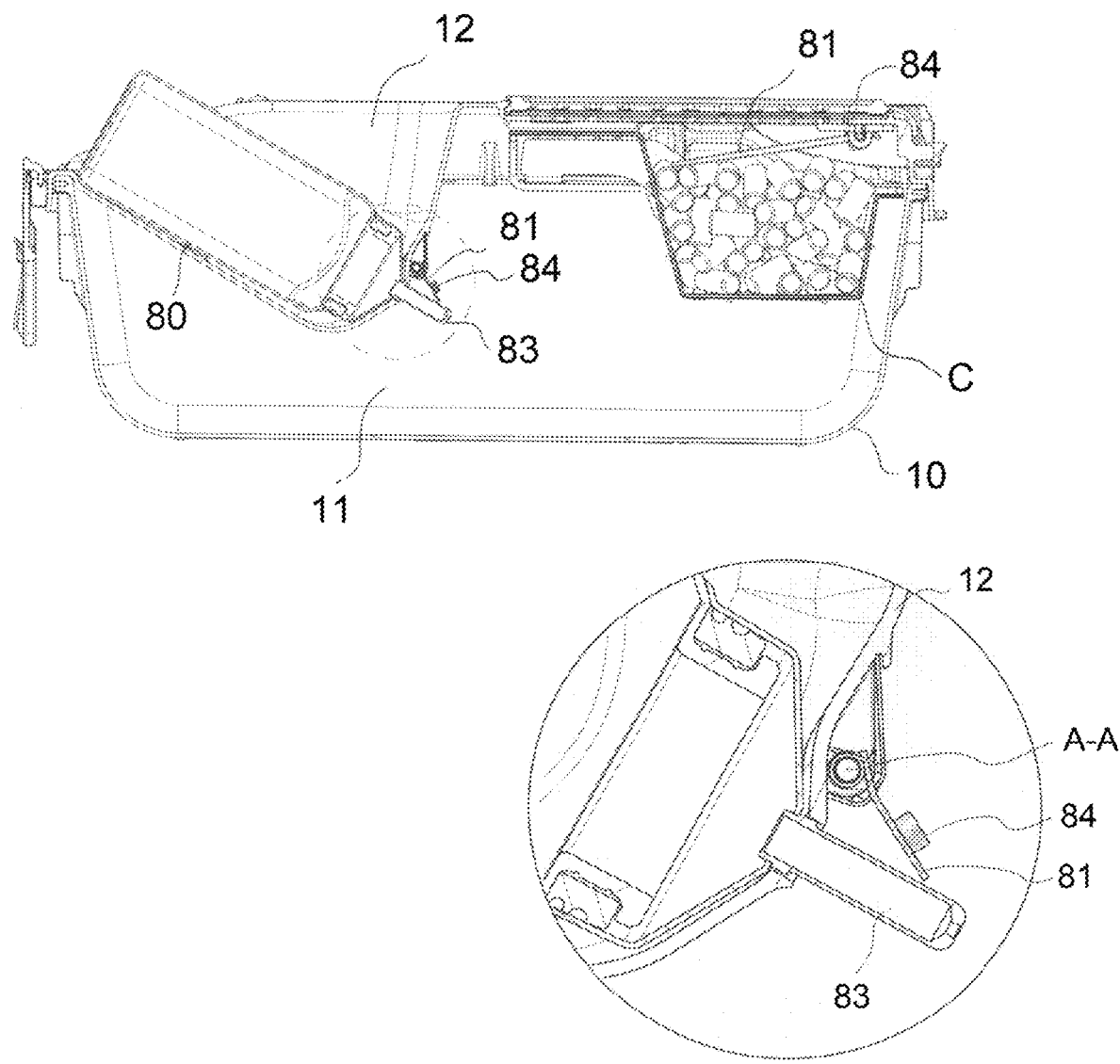
FIG. 7 shows a transparency side view of the cage and a perspective view of a detail of the bottle of FIG. 6.
Figure 8:
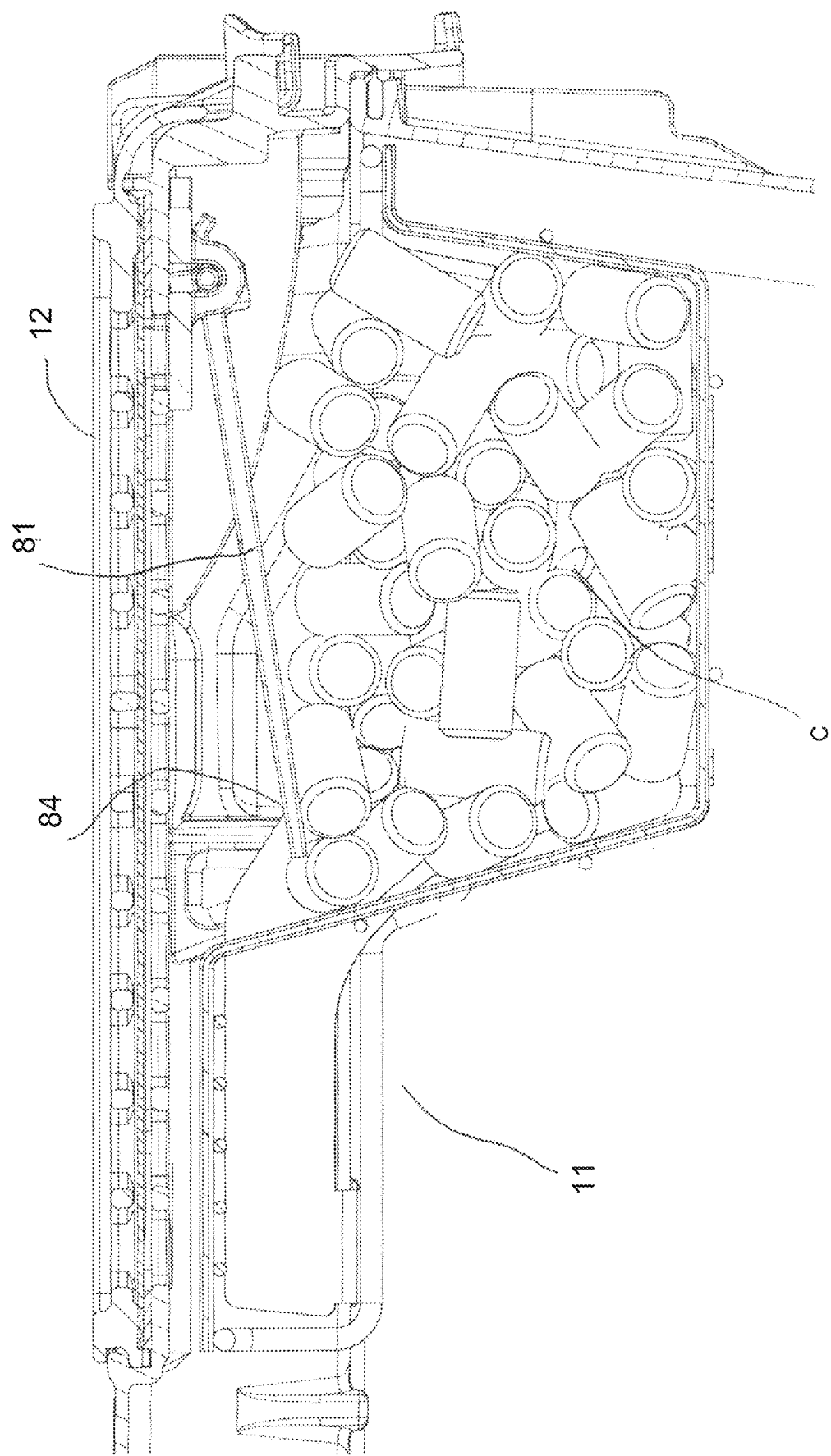
FIG. 8 shows a transparency side view of a cage according to an embodiment of the present invention.
Figure 9:
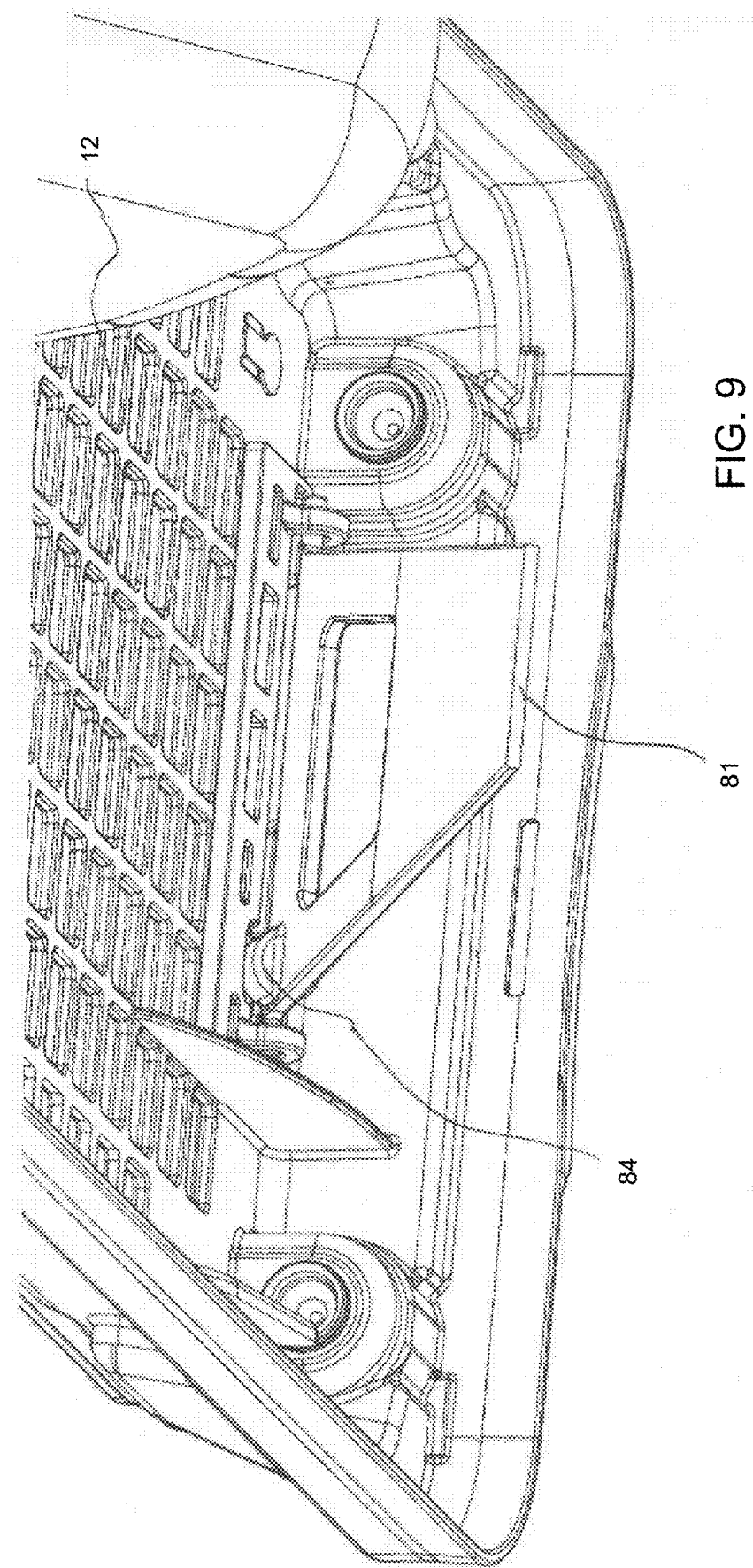
FIGS. 9 and 10 show a further detail of the cage of FIG. 8.
Figure 10:
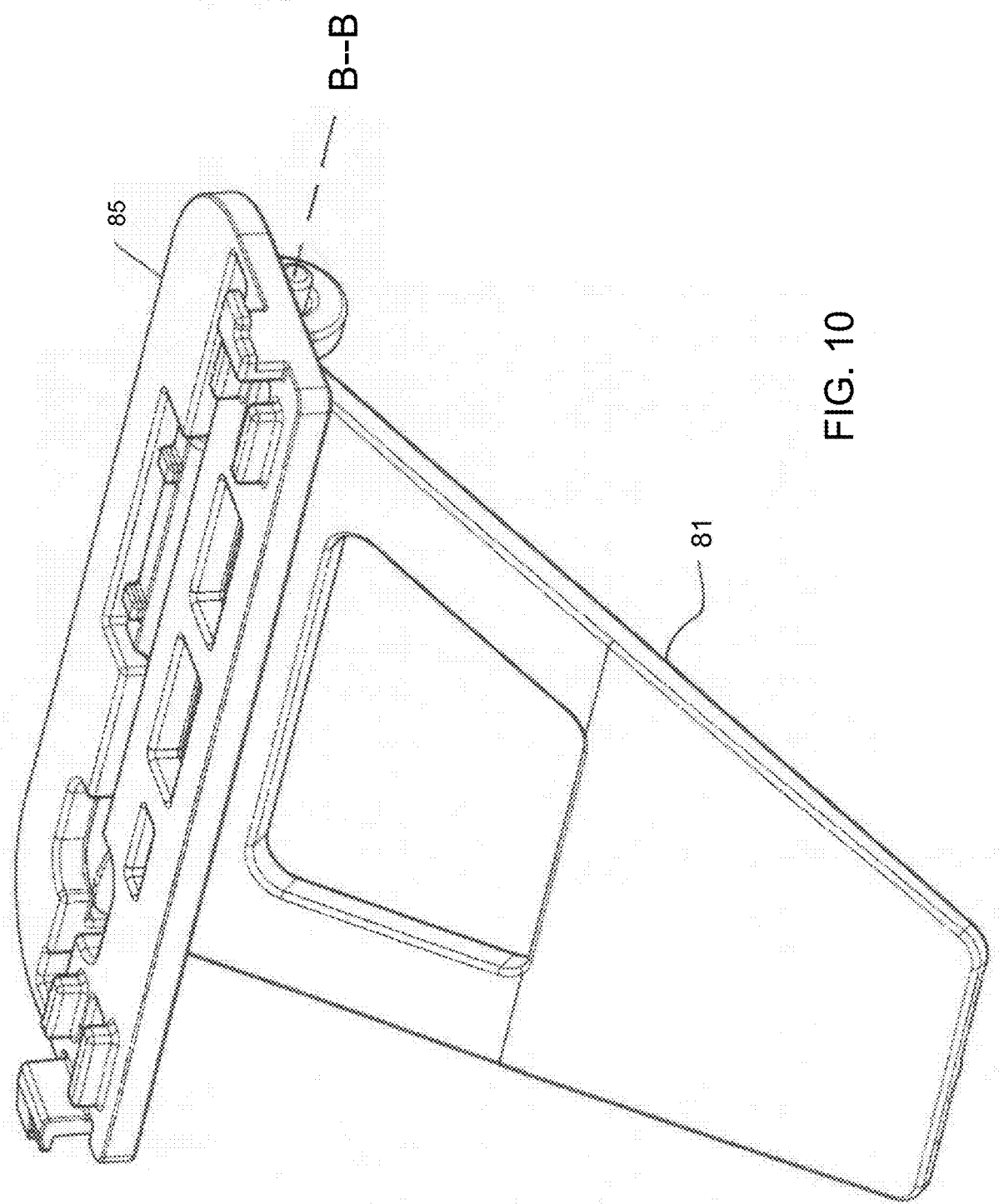
Figure 11:
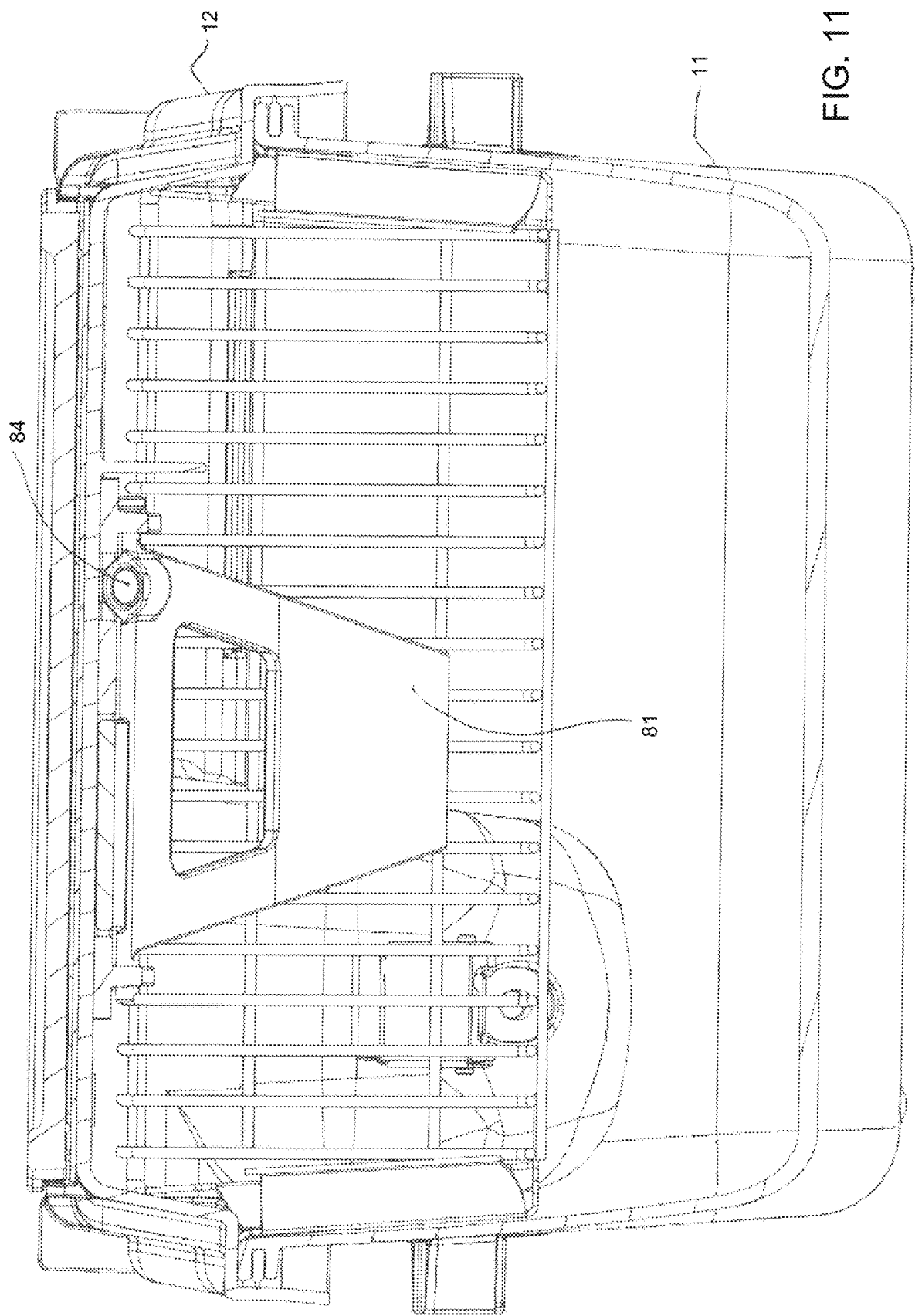
FIG. 11 shows a partial transparency side view of a cage according to an embodiment of the present invention.
Figure 12:
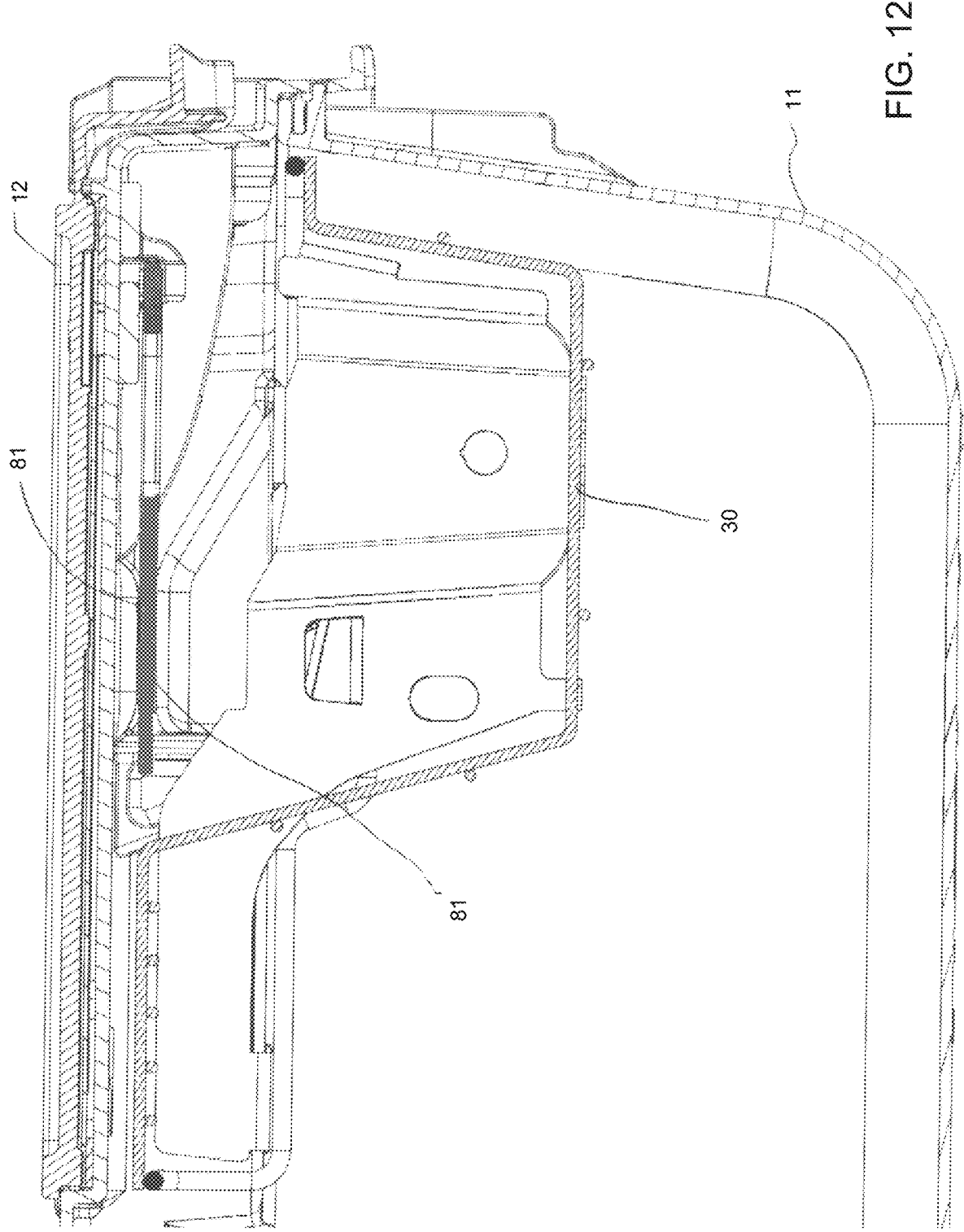
FIGS. 12 to 14 show each a partial transparency side view of a cage according to an embodiment of the present invention.
Figure 13:
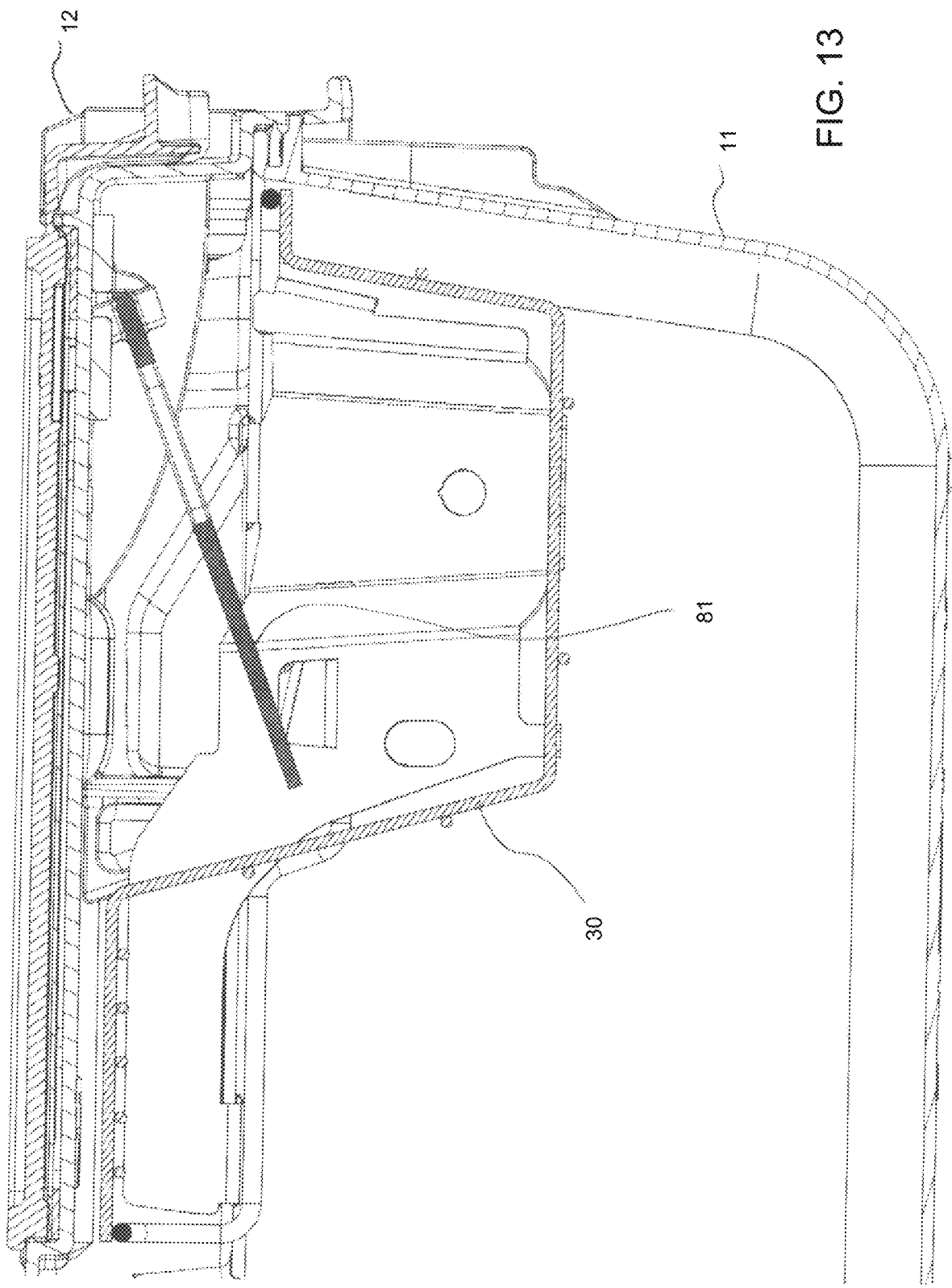
Figure 14:
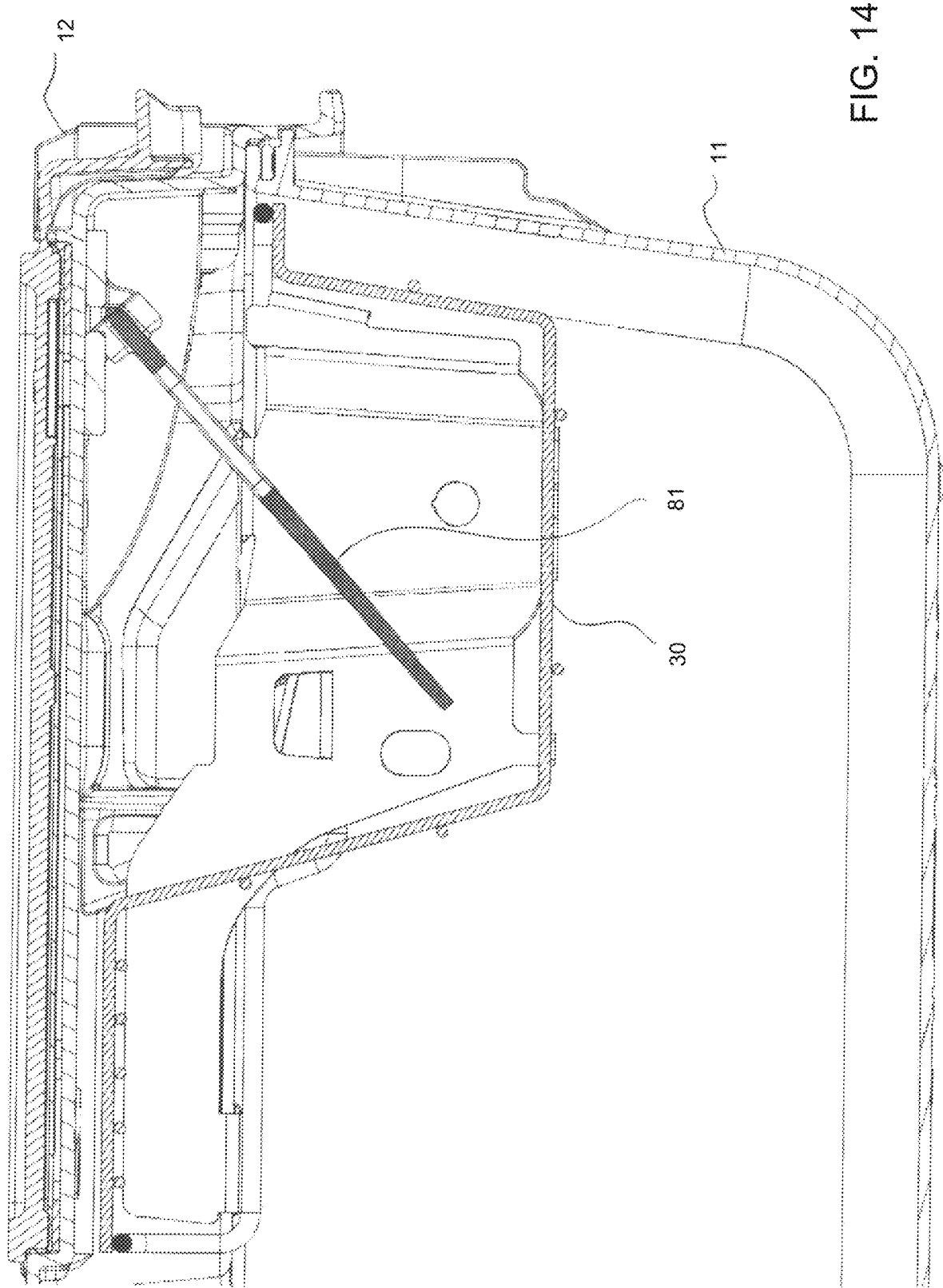

Furthermore, the solution of FIG. 7 may be implemented in the bottle 80, for example by rotatably fastening the fin or swing 81 inside the bottle 80.

With reference to FIGS. 8 to 14, a description of a further embodiment of the present invention will be given below.

According to said further embodiment, an "add-on" or fin 81 is arranged inside the cover 12, in particular, constrained to the cover 12, rotatably about a rotation axis B-B, in a position such that the free end of the fin 81 opposite to the rotation axis B-B is arranged above the accommodation basin of the feeding 30, in particular, resting on the food C (in the form of pellets in the case depicted), when present therein. The fin 81 is constrained to the cover 12 (or alternatively to the feeder 30), so that in the end-of-stroke position the free end of the fin 81 is positioned at about 1 cm from the bottom of the feeder 30 and so as to perform a rotation ranging from 2° in the condition of a full feeder 30 (with several layers of pellets in the feeder 30) to 45° in the condition of an empty or half-empty feeder (with a single layer of pellets in the feeder 30). Furthermore, a magnet 84 (for example, a permanent magnet, see the preceding description), or in any case a component adapted to generate a magnetic field, is fastened on the fin 81. The cage 10 is also equipped with magnetometers, for example the same magnetometers described with reference to the previous embodiment, fastened, for example, to the cover 12 and/or to the tray 11, said magnetometers (not depicted) being adapted to detect, at a distance (inside and/or outside the cage), the intensity and the direction of the magnetic field on 3 orthogonal axes x, y and z. The decrease of the food C in the feeder 30 obviously translates into a rotation of the fin 81 and of the relative magnet 84 about the rotation axis B-B, in this case, in a counter-clockwise direction with respect to FIG. 8, and therefore into a variation of the intensity and/or direction of the magnetic field measured by the magnetometers along the 3 orthogonal axes x, y and z, the variation of the magnetic field as detected (FIG. 15) being ultimately indicative of the quantity of food C inside the feeder 30.

The charts of FIG. 15 show the variation of the magnetic field as a function of the variation of the quantity of food C from the condition of a full feeder 30 to that of an empty feeder 30. The dashed line on the 3 components (x, y, z) of the magnetic field should be observed. The variation is of thousands of counts.

As an alternative to the above solution, the add-on or fin 81 may be released from the cover 12 and be accommodated in the feeder 30 resting on the food C and therefore so as to "float" on the food C contained therein.

Obviously, the above solution, aimed at monitoring the quantity of food C in the feeder 30, may be implemented both as an alternative as well as in addition to the solutions aimed at monitoring the presence of the bottle 80 and/or the amount of liquid inside the bottle 80.

Furthermore, the solution according to each of the above embodiments, aimed at monitoring the quantity of food in the feeder, also allows the monitoring of the presence/absence of the cage in a stowage shelving, wherein the absence of the cage, and therefore of the magnet, translates into a variation along at least two orthogonal axes of the relative magnetic field, said variation being perceptible, for example, by magnetometers positioned on said shelving.

Furthermore, a fin 81, the same as depicted in FIGS. 8 to 14 or in addition to that depicted in FIGS. 8 to 14, may be rotatably fastened to the cover so that the free end thereof, opposite to the rotation axis B-B, is arranged resting against a portion of the feeder, wherein, in this case, it is the removal of the feeder 30 which translates into a rotation of the fin 81 and of the relative magnet 84.

Also in this case, it is possible not only to fasten the magnet 84 to the fin 81, but also to have the fin 81 made of magnetic metal, of plastic with an overmolded magnet 84, of a magnetic polymer and/or according to similar solutions not described in detail, for the sake of synthesis.

Finally, for fixing the fin 81, the same may be rotatably constrained to a fastening element adapted to be fastened, in turn, (for example by exploiting the elastic properties thereof) to the cover 12 and/or to the feeder 30, in particular, by exploiting the hooking points defined by the grid 121.

FIGS. 17 to 19 show how a solution similar to those described above may be implemented in a shelving (rack) 500 of a plurality of cages 10, for example arranged in a matrix, as in the case depicted, and therefore along vertical columns and horizontal planes.

In fact, one or more magnets and magnetometers may be positioned with respect to at least one or each of the cages 10 so that the absence of said at least one cage translates into a variation, detectable by the magnetometers, of at least the intensity and/or direction of said magnetic field along at least one of said directions orthogonal to each other (x, y and z) with respect to the intensity and/or the direction of said magnetic field, respective, along at least one of said directions orthogonal to each other (x, y and z) in the presence of said container. Alternatively, the magnets provided for monitoring the presence of the bottle 80 and/or the quantity of liquid therein, and/or for monitoring the presence of the feeder 30 and/or the quantity of food C therein, may be used, wherein the removal of a cage translates into a variation of the magnetic field detected by the relative magnetometers fastened to the shelving or rack 500.

Thus, it has been demonstrated by the above description of the embodiments of the present invention, depicted in the drawing tables, that the present invention allows the preset objects to be achieved, overcoming or at least reducing the issues and/or drawbacks encountered in the background art. In particular, the present invention allows to:

provide a solution for monitoring and/or detecting, which is not affected by obstructions inside the cage (enrichments, movements of animals, displacement or accumulation of litter or other material);

provide a solution which allows to concentrate the electronics on a single planar circuit outside the cage;

not be affected by the issue linked to the dirtiness and degradation (opacity) of the materials (typical of IR solutions) due both to aging and to autoclaving, or to optical obstruction (issue encountered both in IR systems as well as in video camera systems).

Although the present invention has been clarified and described with reference to the embodiments thereof depicted in the drawings, the present invention is not limited to the embodiments described above and depicted on the drawings; on the contrary, ail the variants of the embodiments described and depicted, which will appear clear and obvious to a person skilled in the art, are within the scope of the present invention.

For example, to monitor the presence/absence of the bottle 80 and/or of the liquid therein, use may be made of:
 a magnet fastened to the fin or swing 81;
 a magnet which may be mounted on the swing 81;
 a fin 81 made of magnetic metal;
 a plastic fin 81 with overmolded magnet;
 a fin 81 made of magnetic silicone;
 a fin 81 made of a magnetic polymer;
 a magnet applied to the outside or inside of the bottle 80;
 a magnet fastened on the cap (end part with dispensing nozzle) of the bottle 80;
 a magnetic cap of the bottle 80;
 a cap of the bottle 80 with a plastic or magnetic rubber insert;
 a magnetic gasket of the cap of the bottle 80;
 a magnetic bottle 80.

Similarly, for monitoring or detecting the presence of the feeder 30 and/or of the quantity of food C therein, according to the present invention, use may be made of:
 a magnet 84 fastened on the feeder 30;
 a magnet 84 which may be mounted on the feeder 30;
  a feeder 30 made of magnetic metal;
  a plastic feeder 30 with overmolded magnet;
  a feeder 30 made of a magnetic polymer;
  a fin 81 fastened to the feeder 30 or to the cover 12 in a stable or removable manner, equipped with a magnet which rotates resting on the pellets of food C in the feeder 30;

a fin 81 with structure made of:
metal
superelastic alloys
plastic
rubber
shape memory alloys which change the extension thereof and the size thereof at temperatures >75° C. so that during the steps of handling the washing and autoclaving of the cage, the structure itself locks into a position which allows it to withstand mechanical stress or breakages.

Finally, it should be noted that, within the context of the present invention, the permanent magnets 84 may be replaced and changed by means of electromagnets, controlled in current, for example, comprising a solenoid, consisting of one or more coils, crossed by an electric current, which produces a magnetic field.

In fact, the electro magnets are a valid alternative due to the fact that they may be operated at will.

Finally, the magnet 84 may be fastened to or incorporated into "enrichments", usually arranged inside the cage, such as, for example, entertainment and/or playing balls, in this case for monitoring the presence/absence of the cage.

The field or scope of protection of the present invention is thus defined by the claims.

We claim:

1. A cage for housing laboratory animals, said cage comprising a bowl and a cap which may be positioned on said bowl in a removable manner, wherein said cap and said bowl, with said cap positioned on said bowl, define an internal space which is closed and not accessible from the outside, wherein in said internal space a feeder is positioned, adapted to contain food adapted to feed said laboratory animals, wherein said cage is equipped with first means adapted to detect the presence and/or quantity of food in said feeder, characterized in that said first means adapted to detect the presence and/or quantity of food in said feeder comprise first means adapted to generate a magnetic field and first means adapted to detect and measure said magnetic field along at least two directions orthogonal to one another, and wherein said first means adapted to generate said magnetic field are movable and positioned so that each variation equal to or greater than a predefined variation of the quantity of food in said feeder translates into a variation of at least the intensity and/or the direction of said magnetic field along at least one of said two directions orthogonal to one another.

2. The cage according to claim 1, wherein said first or second or third means adapted to generate a magnetic field comprise a permanent magnet or an electromagnet.

3. A shelving for housing laboratory animals, wherein said shelving is shaped so as to be capable of housing a plurality of cages, wherein said shelving comprises fourth means adapted to detect the presence and absence of at least one of said cages, wherein said fourth means adapted to detect the presence and absence of said at least one cage comprise fourth means adapted to generate a magnetic field and second means adapted to detect and measure said magnetic field along at least three directions orthogonal to one another, and wherein said fourth means adapted to generate said magnetic field are positioned with respect to said at least one cage so that the absence of said at least one cage translates into a variation of at least the intensity and/or the direction of said magnetic field along at least one of said directions orthogonal to one another with respect to the intensity and/or, respectively, the direction of said magnetic field along at least one of said directions orthogonal to one another in the presence of said cage, wherein said at least one cage is a cage according to one of claim 1.

4. The cage according to claim 1, wherein said first means adapted to generate a magnetic field are applied to a first movable support adapted to be arranged resting on the food contained in said feeder.

5. The cage according to claim 4, wherein said first movable support is rotatably fastened to said cap above said feeder so that the free end of said first movable support may be arranged resting on the food inside said feeder, wherein the decrease in the food inside said feeder translates into a rotation of said first movable support in a first direction of rotation, while the increase in the food inside said feeder translates into the rotation of said movable support in a second direction of rotation opposite to said first direction of rotation.

6. The cage according to claim 1, wherein said cage is also equipped with a liquid container adapted for watering said laboratory animals, and wherein said cage is also equipped with second means adapted to detect the presence and/or quantity of said liquids inside said container, and wherein said second means adapted to detect the presence and/or quantity of liquids in said container comprise second means adapted to generate a magnetic field and wherein said second means adapted to generate said magnetic field are movable and positioned so that each variation equal to or greater than a predefined variation of the quantity of said liquids in said container translates into a variation of at least the intensity and/or the direction of said magnetic field along at least one of said two directions orthogonal to one another.

7. The cage according to claim 6, wherein said second means adapted to generate a magnetic field are applied to a floating movable support adapted to be arranged inside said container floating on the liquids contained therein.

8. The cage according to claim 6, wherein said cap defines at least one recess adapted to house at least part of said container for watering liquids outside said cage.

9. The cage according to claim 1, wherein said cage is also equipped with a liquid container adapted for watering said laboratory animals, and wherein said cage is also equipped with third means adapted to detect the presence and absence of said container, wherein said third means adapted to detect the presence of said container comprise third means adapted to generate a magnetic field and wherein said third means adapted to generate said magnetic field are positioned with respect to said container so that the absence of said container translates into a variation of at least the intensity and/or the direction of said magnetic field along at least one of said two directions orthogonal to one another with respect to the intensity and/or the direction of said magnetic field along at least one of said two directions orthogonal to one another in the presence of said container.

10. The cage according to claim 9, wherein said third means adapted to generate said magnetic field are fastened to said container in positions which are fixed with respect to said container.

11. The cage according to claim 9, wherein said third means adapted to generate a magnetic field are applied to a second movable support adapted to be arranged resting on a predefined portion of said container, and wherein said second movable support is rotatably fastened to said cage so that the free end of said second movable support, in the presence of said container, is arranged resting on said predefined portion of said container, so that the removal of said container translates into a rotation of said second movable support in a first direction of rotation, and therefore in a variation of at least the intensity and/or the direction of said magnetic field along at least one of said two directions orthogonal to one another with respect to the intensity and/or the direction of said magnetic field along at least one of said two directions orthogonal to one another in the presence of said container.

12. A cage for housing laboratory animals, said cage comprising a bowl and a cap which may be positioned on said bowl in a removable manner, wherein said cap and said bowl, with said cap positioned on said bowl, define an internal space which is closed and not accessible from the outside, wherein said cage is equipped with a liquid container adapted for watering said laboratory animals, wherein said cage is equipped with second means adapted to detect the presence and/or quantity of said liquids inside said container, wherein said second means adapted to detect the presence and/or quantity of liquids in said container comprise second means adapted to generate a magnetic field and second means adapted to detect and measure said magnetic field along at least two directions orthogonal to one another, and wherein said second means adapted to generate said magnetic field are movable and positioned so that each variation equal to or greater than a predefined variation of the quantity of said liquids in said container translates into a variation of at least the intensity and/or the direction of said magnetic field along at least one of said two directions orthogonal to one another.

13. The cage according to claim 12, wherein said second means adapted to generate a magnetic field are applied to a floating movable support adapted to be arranged inside said container floating on the liquids contained therein.

14. The cage according to claim 12, wherein said cap defines at least one recess adapted to house at least part of said container for watering liquids outside said cage.

15. A cage for housing laboratory animals, said cage comprising a bowl and a cap which may be positioned on said bowl in a removable manner, wherein said cap and said bowl, with said cap positioned on said bowl, define an internal space which is closed and not accessible from the outside, wherein said cage is equipped with a liquid container adapted for watering said laboratory animals, wherein said cage is equipped with third means adapted to detect the presence and absence of said container, wherein said third means adapted to detect the presence of said container comprise third means adapted to generate a magnetic field and third means adapted to detect and measure said magnetic field along at least two directions orthogonal to one another, and wherein said third means adapted to generate said magnetic field are positioned with respect to said container so that the absence of said container translates into a variation of at least the intensity and/or the direction of said magnetic field along at least one of said two directions orthogonal to one another with respect to the intensity and/or the direction of said magnetic field along at least one of said two directions orthogonal to one another in the presence of said container.

16. The cage according to claim 15, wherein said third means adapted to generate said magnetic field are fastened to said container in positions which are fixed with respect to said container.

17. The cage according to claim 15, wherein said third means adapted to generate a magnetic field are applied to a second movable support adapted to be arranged resting on a predefined portion of said container, and wherein said second movable support is rotatably fastened to said cage so that the free end of said second movable support, in the presence of said container, is arranged resting on said predefined portion of said container, so that the removal of said container translates into a rotation of said second movable support in a first direction of rotation, and therefore in a variation of at least the intensity and/or the direction of said magnetic field along at least one of said two directions orthogonal to one another with respect to the intensity and/or the direction of said magnetic field along at least one of said directions orthogonal to one another in the presence of said container.

18. A shelving for housing laboratory animals, wherein said shelving is shaped so as to be capable of housing a plurality of cages, wherein said shelving comprises fourth means adapted to detect the presence and absence of at least one of said cages, wherein said fourth means adapted to detect the presence and absence of said at least one cage comprise fourth means adapted to generate a magnetic field and second means adapted to detect and measure said magnetic field along at least three directions orthogonal to one another, and wherein said fourth means adapted to generate said magnetic field are positioned with respect to said at least one cage so that the absence of said at least one cage translates into a variation of at least the intensity and/or the direction of said magnetic field along at least one of said directions orthogonal to one another with respect to the intensity and/or, respectively, the direction of said magnetic field along at least one of said directions orthogonal to one another in the presence of said cage; and wherein said fourth means adapted to generate a magnetic field are applied to a third movable support adapted to be arranged resting on a predefined portion of said at least one cage, wherein said third movable support is rotatably fastened to said shelving so that the free end of said third movable support, in the presence of said at least one cage, is arranged resting on said predefined portion of said at least one cage, and therefore wherein the removal of said at least one cage from said shelving translates into a rotation of said third movable support in a first direction of rotation and therefore into a variation of at least the intensity and/or the direction of said magnetic field along at least one of said directions orthogonal to one another with respect to the intensity and/or, respectively, the direction of said magnetic field along at least one of said directions orthogonal to one another in the presence of said cage.

* * * * *